US009605092B2

(12) United States Patent
Parisel et al.

(10) Patent No.: US 9,605,092 B2
(45) Date of Patent: Mar. 28, 2017

(54) POLYMERISATION PROCESS

(71) Applicant: INEOS EUROPE AG, Rolle (CH)

(72) Inventors: Marc Jean-Marie Ghislain Parisel, Vilvoorde (BE); Philip Van Breuseghem, Temse (BE); Brent R. Walworth, Sint-Niklaas (BE)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/903,372

(22) PCT Filed: Jul. 22, 2014

(86) PCT No.: PCT/EP2014/065725
§ 371 (c)(1),
(2) Date: Jan. 7, 2016

(87) PCT Pub. No.: WO2015/018635
PCT Pub. Date: Feb. 12, 2015

(65) Prior Publication Data
US 2016/0152743 A1  Jun. 2, 2016

(30) Foreign Application Priority Data

Aug. 5, 2013 (GB) .................. 1313937.3

(51) Int. Cl.
*C08F 2/00* (2006.01)
*C08F 110/06* (2006.01)
*C08F 110/02* (2006.01)
*C08F 210/02* (2006.01)
*C08F 6/00* (2006.01)

(52) U.S. Cl.
CPC ............ *C08F 110/02* (2013.01); *C08F 6/003* (2013.01); *C08F 6/005* (2013.01); *C08F 110/06* (2013.01); *C08F 210/02* (2013.01); Y02P 20/582 (2015.11)

(58) Field of Classification Search
CPC .... C08F 210/02; C08F 110/06; C08F 110/02; C08F 6/005; C08F 6/003; C08F 2/001; C08F 2/14; C08F 2/01; C08F 210/14; C08F 2500/07; C08F 2500/08; C08F 2500/05; C08L 23/0815; Y02P 20/582

USPC .................... 526/64, 65, 351, 352
See application file for complete search history.

(56) References Cited

U.S. PATENT DOCUMENTS

| 6,713,561 | B1 | 3/2004 | Berthold et al. |
| 2008/0090968 | A1 | 4/2008 | Berthold et al. |
| 2008/0139750 | A1 | 6/2008 | Berthold et al. |
| 2008/0236784 | A1 | 10/2008 | Liebel |
| 2009/0105422 | A1 | 4/2009 | Berthold et al. |
| 2010/0301054 | A1 | 12/2010 | Berthold et al. |
| 2011/0152474 | A1* | 6/2011 | Gessner ............... C08F 210/16 526/65 |
| 2011/0171450 | A1 | 7/2011 | Berthold et al. |
| 2011/0318559 | A1 | 12/2011 | Berthold et al. |
| 2015/0025202 | A1 | 1/2015 | Marissal et al. |
| 2015/0025203 | A1 | 1/2015 | Marissal et al. |
| 2015/0065665 | A1 | 3/2015 | Marissal et al. |

FOREIGN PATENT DOCUMENTS

| EP | 1 041 113 A1 | 10/2000 |
| EP | 2 336 200 A1 | 6/2011 |
| EP | 2 336 201 A1 | 6/2011 |
| WO | WO 2004/056921 A1 | 7/2004 |
| WO | WO 2004/058878 A1 | 7/2004 |
| WO | WO 2006/045550 A1 | 5/2006 |
| WO | WO 2006/053740 A1 | 5/2006 |
| WO | WO 2011/000497 A1 | 1/2011 |
| WO | WO 2011/076371 A1 | 6/2011 |
| WO | WO 2013/113797 A1 | 8/2013 |

* cited by examiner

*Primary Examiner* — William Cheung
(74) *Attorney, Agent, or Firm* — Nixon & Vanderhye P.C.

(57) ABSTRACT

Polymerization process, in particular for the polymerization of monomer selected from ethylene and propylene in a reaction system containing at least three reactors operated in series. The process includes (a) polymerizing monomer in a first reactor having a volume of at least 50 m$^3$ to produce a first polymer, (b) passing the first polymer to a second reactor and polymerizing monomer in the second reactor to produce a second polymer containing the first polymer and polymer produced in the second reactor, and (c) passing the second polymer to a third reactor and polymerizing monomer in the third reactor to produce a third polymer containing the second polymer and polymer produced in the third reactor. The polymerizations are performed such that between 0.01 and 5 w % of the total mass of the third polymer is polymer produced in the second reactor.

27 Claims, No Drawings

POLYMERISATION PROCESS

This application is the U.S. national phase of International Application No. PCT/EP2014/065725 filed Jul. 22, 2014 which designated the U.S. and claims priority to British Patent Application No. 13139373.3 filed Aug. 5, 2013, the entire contents of each of which are hereby incorporated by reference.

The present invention relates to a polymerisation process and a multimodal polymer, and in particular to the polymerisation of monomer in a reactor system comprising at least three reactors in series, and the product thereof.

The production of polymer powder by polymerisation reactions of monomers in the presence of catalysts is well-known. For example, processes are known and widely operated commercially using both fluidised bed reactors and slurry phase reactors.

In a slurry polymerisation process the polymerisation is conducted in a stirred tank or, preferably, a continuous loop reactor in which a slurry of polymer particles in a liquid medium comprising hydrocarbon diluent is circulated. During the course of polymerisation, fresh polymer is generated by the catalytic polymerisation of monomer and polymer product is removed from the reactor by removing a portion of the slurry.

In a single reactor system the slurry withdrawn from the reactor is treated to separate the polymer particles from the hydrocarbon diluent and other components, such as unreacted monomers, which it is generally desired are recycled to the reactor.

The process where polymer is formed in two or more reactors in series is also known. The separate reactors can be operated to produce the same product in each reactor, but are most advantageously operated to produce different products in each reactor, in particular to make bimodal or multimodal polymer products.

In a process with three or more reactors, for example, polymer is produced in a first reactor, withdrawn in the form of a slurry and passed to a second reactor where further production of polymer takes place, and then passed to a third reactor where yet further production of polymer takes place. Polymer slurry withdrawn from the final reactor is treated to separate the polymer solids from diluent and unreacted reactants, which it is generally desired to recycle to the process.

In a typical separations process, which is also generally used for single and dual reactor systems, withdrawn slurry is heated and passed to a first separation step in which the majority of the diluent and unreacted monomers and comonomers are separated from the polymer solids as a gas (flash gas) at relatively high pressure such that the gas can be condensed without compression and recycled. This is commonly referred to as a "flash step".

Remaining solids and residual diluent are then sent to a second separation step, which may be a further flash tank or may be a flush column where the solids are contacted with a flush gas, such as nitrogen, to remove residual diluent, monomers and comonomers. The second separation step is usually at a lower pressure, and diluent, unreacted monomer and any comonomer separated in the second separator need to be separated from any flush gas, and usually need to be compressed prior to recycle.

Thus, the overall polymerisation process generally includes both high pressure and low pressure recovery systems for recovery and recycle of diluent, monomers and comonomers.

The polymer solids may be taken to further processing, such as blending or pelleting, or to storage.

We have now found an improved process for polymerisation taking place in three or more reactors in series wherein a relatively small fraction of the total polymer is produced in the intermediate reactor.

Thus, in a first aspect the present invention provides a process for the polymerisation of monomer selected from ethylene and propylene in a reaction system comprising at least three reactors operated in series, which process comprises (a) polymerising monomer in a first reactor, said first reactor having a volume of at least 50 m$^3$, to produce a first polymer, (b) passing the first polymer to a second reactor and polymerising monomer in the second reactor to produce a second polymer comprising the first polymer and polymer produced in the second reactor, (c) passing the second polymer to a third reactor and polymerising monomer in the third reactor to produce a third polymer comprising the second polymer and polymer produced in the third reactor, wherein the polymerisations are performed such that between 0.01 and 5 wt % of the total mass of the third polymer is polymer produced in the second reactor.

The process of the present invention may be operated in any suitable reactors. The reactors may be gas or slurry phase reactors, or a combination of gas and slurry phase reactors.

Preferably the first reactor is a slurry reactor, and most preferably is a slurry loop reactor.

Preferably the third reactor is a slurry reactor, and most preferably is a slurry loop reactor. The third reactor also preferably has a volume of at least 50 m$^3$.

More preferably both the first and third reactors are slurry loop reactors, and most preferably both have a volume in the range 75 to 200 m$^3$.

The reactions in the first and third reactors are "conventional" slurry polymerisation reactions, and their operation is well-known. For example, as applied to slurry loop reactors, the reactors are operated "liquid-full" and a slurry of polymer particles in a liquid medium comprising hydrocarbon diluent and monomer is circulated. During the course of polymerisation, fresh polymer is generated by the catalytic polymerisation of monomer and polymer product is removed from the reactor by removing a portion of the slurry. The removal may be continuous or discontinuous. Fresh monomer and, where present, comonomer, are added to replace components which have reacted.

The second reactor in the process of the present invention is operated to produce a relatively small amount of polymer compared to the first and third reactors. The second reactor preferably also comprises a slurry phase. More preferably the reaction in the second reactor takes place in a vessel or combination of vessels in which both a liquid and a vapour phase are present. A preferred reactor comprises a stirred tank wherein the tank comprises a liquid phase and a vapour phase.

The conditions in the second reactor, including the temperature, pressure and residence time, may be controlled to obtain the required amount of polymerisation therein. The conditions in the second reactor may be such that the production rate (amount of polymer produced per unit time) is reduced compared to the first and third reactors. More preferably, the space time yield (STY) in the second reactor, which is a measure of the amount of polymer produced per unit time per unit volume of the reactor, is reduced in the second reactor compared to the first and third reactors.

The pressure in the second reactor may be any suitable pressure. The pressure is usually lower than that in either of the first and third reactors, and can be significantly so. For example, the pressure in the second reactor can be up to 95% lower than the lowest of the first reactor pressure and the third reactor pressure. (As used herein the percentage reduction in pressure is obtained by deducting the absolute pressure in the second reactor from the absolute pressure in the relevant (lowest pressure) one of the first and third reactor, then dividing the result by the absolute pressure of said first or third reactor, and multiplying this number by 100. As an Example, if the second reactor is at 0.2 MPa absolute (2 bara) and the third reactor is at 2.1 MPa absolute (21 bara), then the percentage reduction is 100*[(2.1−0.2)/2.1], which corresponds to the second reactor having a pressure 90.5% lower than that in the third reactor.)

The pressure in the second reactor is preferably 10-90% lower, more preferably 30-80% lower and most preferably 50-70% lower, than the lowest of the first reactor pressure and the third reactor pressure.

Unless otherwise indicated, values of pressure as quoted herein are "absolute" values rather than "gauge" values. The pressure in the second reactor is usually at least 0.15 MPa (1.5 bar), is typically above 0.5 MPa (5 bar), preferably between 0.7 MPa and 1.5 MPa, and most preferably between 0.8 MPa and 1.2 MPa.

The temperature in the second reactor is preferably in the range 40 to 100° C., and more preferably in the range 50-85° C. In a second reactor comprising liquid and vapour phases the temperature is preferably selected such that, at the pressure therein, the distribution of diluent present between the liquid and vapour phases is such that at least 30% of the diluent is in the liquid phase.

The residence time in the second reactor is preferably in the range of 10 to 90 minutes, and more preferably 15 to 60 minutes.

In the process of the present invention between 0.01 and 5 wt % of the total mass of the third polymer is polymer produced in the second reactor. Preferably between 0.1 and 5 wt % of the total mass of the third polymer is polymer produced in the second reactor. More preferably less than 5 wt %, for example up to 4.5 wt % of, such as up to 4 wt % of the total mass of the third polymer is polymer produced in the second reactor. Even more preferably between 0.25 and 2.5 wt % of polymer, and most preferably between 0.5 and 1.5 wt % of polymer, based on total mass of the third polymer, is polymer produced in the second reactor.

In general, at least 30 wt % of the total mass of the third polymer is usually produced in each of the first and third reactors, such as 30-70 wt % in the first reactor and 30-70 wt % in the second reactor. More preferably at least 40 wt % of the total mass of the third polymer is usually produced in each of the first and third reactors, such as 40-60 wt % in the first reactor and 40-60 wt % in the second reactor.

The amounts of polymer formed in each reactor may be obtained by any suitable method. As one example, the amounts may be obtained by extracting and analysing the product produced in each reactor. The polymer produced in the second reactor can then be obtained by difference by subtracting the results for the first polymer from the results for the second polymer. Similarly, the polymer produced in the third reactor can then be obtained by difference by subtracting the results for the second polymer from the results for the third polymer. The person skilled in the art will be aware of other methods which could be used.

The present invention preferably provides a process for the polymerisation of monomer selected from ethylene and propylene in a reaction system comprising at least three reactors operated in series, which process comprises
  (a) polymerising monomer in a first reactor, said first reactor having a volume of at least 50 m$^3$, to produce a slurry of a first polymer,
  (b) passing a slurry of the first polymer to a second reactor and polymerising monomer in the second reactor to produce a slurry of a second polymer, said second polymer comprising the first polymer and polymer produced in the second reactor,
  (c) passing a slurry of the second polymer to a third reactor and polymerising monomer in the third reactor to produce a slurry of a third polymer, said third polymer comprising the second polymer and polymer produced in the third reactor, wherein the polymerisations are performed such that between 0.01 and 5 wt % of the total mass of the third polymer is polymer produced in the second reactor.

For avoidance of doubt, the slurry of the first polymer passed to the second reactor may not be exactly the same slurry as removed from the first reactor. For example the slurry withdrawn from the first reactor may be treated to remove certain components, such as impurities or to concentrate or dilute the solids, prior to being passed to the second reactor.

Preferably the slurry of first polymer is withdrawn from the first reactor and passed to the second reactor whilst still containing unreacted monomer (and comonomer if present in the first reactor), and catalyst, as discussed further below.

The same applies for the slurry of the second polymer passed to the third reactor relative to the slurry as removed from the second reactor.

In general the amount of reaction required in the second reactor is such that it may not be necessary to separately add monomer to the second reactor. For example, in the process where a slurry of the first polymer from the first reactor is passed to the second reactor the slurry may, and preferably does, comprise unreacted monomer from the first reaction. Preferably however, a separate feed comprising monomer is added to the second reactor. ("Separate feed" of a component as used herein meaning a feed of the component separate to any of said component passed to the second reactor with the polymer from the first reactor.) This increases the amount of monomer available to ensure it is sufficient for the required production of polymer in the second reactor.

It is also possible to add a separate feed comprising catalyst or catalyst components e.g. co-catalyst or activator, to the second reactor if required. However, this is not preferred. For example, where a slurry of the first polymer from the first reactor is passed to the second reactor the slurry will usually comprise active catalyst from the first reaction. This catalyst is then used as the catalyst for the reaction taking place in the second reactor. (It should also be noted that active "fines" can be passed to the second reactor in some embodiments, which is discussed further below.)

As another example, depending on the process configuration, a separate feed comprising comonomer may be fed to the second reactor.

It is also possible, and preferred, to feed a separate feed comprising diluent to the second reactor, for example to dilute the solids in the liquid phase in the second reactor.

(For avoidance of doubt a single "separate feed" may be used to feed more than one of the above components.)

Preferred compositions in the liquid phase in the second reactor comprise 0.1 to 1 mol % monomer, preferably at least 0.3 mol % and/or up to 0.7 mol %.

Preferred compositions in the liquid phase in the second reactor comprise less than 0.5 mol % hydrogen, and preferably less than 0.2 mol %. Preferably the liquid phase comprises essentially no hydrogen, by which is meant less than 0.05 mol %.

An important parameter is the molar ratio of comonomer to monomer in the liquid phase in the second reactor. Preferably this is from 24:1 to 4:1, and more preferably from 16:1 to 6:1, by moles of comonomer to monomer. Most preferably his ratio is higher in the second reactor than in either of the first and third reactors.

Thus, in the second reactor an increased proportion of the weight of the polymer formed may be due to the comonomer component compared to the polymer formed in either the first or third reactors.

The additional polymer formed in the second reactor will preferably have a density between 900 and 940 kg/m3. The density is generally less than the densities of the polymers formed in the first and third reactors. For example, the polymer formed in the first reactor preferably has a density of at least 940 kg/m3, whilst the additional polymer formed in the third reactor preferably has a density between the densities of the polymers formed in the first and second reactors. Further details of the properties of the polymer formed in each reactor are as described for the third aspect of the present invention below.

In a most preferred embodiment of the present invention there is fed to the second reactor the first polymer and a stream comprising monomer which is derived from the effluent withdrawn from the third or a subsequent reactor.

In particular, where the first polymer is provided to the second reactor in the form of a slurry of the first polymer, there is fed to the second reactor
 (a) a slurry of the first polymer, and
 (b) a first stream comprising the monomer and which is derived from the effluent withdrawn from the third reactor or a subsequent reactor.

The first stream in this embodiment comprises monomer derived from the effluent withdrawn from the third reactor or a subsequent reactor (e.g. a fourth or even a fifth reactor in series). In particular, the "subsequent reactor" option can apply where there are 4 or more reactors present in series, at least one of these being subsequent to the third reactor.

For example, four reactors present in a series may be considered as reactors "A", "B", "C" and "D". The present invention may be applied by passing a polymer from reactor A (first reactor) to reactor B (second reactor) with a first stream which may comprise monomer derived from the effluent withdrawn from reactor C (the third reactor) or may comprise monomer derived from the effluent withdrawn from reactor D (fourth reactor) (or derived from both reactors C and D).

For avoidance of doubt, the present invention may be applied in such a four reactor series between reactors B and C by passing a polymer from reactor B to reactor C with a first stream which comprises monomer derived from the effluent withdrawn from reactor D (i.e. in this option reactor B may be considered as the "first reactor", reactor C as the "second reactor" and reactor D as the "third reactor".)

In general, where the third or subsequent reactor is a slurry reactor, the third or subsequent reactor produces an effluent in the form of a slurry of polymer solids in a liquid medium comprising diluent. This stream is usually treated to vaporise the components of the liquid medium, which are then separated from the polymer solids.

The first stream is preferably at least a portion of this separated stream, more preferably a majority of, yet more preferably at least 80% by weight of, and most preferably, essentially all of this separated stream.

The first stream thus preferably comprises, in addition to monomer, reaction diluent and smaller quantities of other vaporisable components which can be present in the effluent, such as hydrogen.

The first stream preferably comprises mainly diluent. The first stream preferably comprises at least 1 mol % of monomer, for example 1-5 mol % of monomer. More preferably the first stream comprises at least 2 mol % of monomer and/or up to 4 mol % of monomer.

Preferably, the first stream as passed to the second reactor comprises monomer vapour derived from the effluent withdrawn from the third or subsequent reactor. In particular, it is generally preferred that a majority of, yet more preferably at least 80% by weight of, and most preferably essentially all of the first stream is in vapour form when passed to the second reactor.

Preferably at least part of the first stream may be passed to the second reactor without compression and/or at least part of the first stream may be passed to the second reactor without indirect cooling.

This also allows said stream to be recycled to the third reactor without compression and/or indirect cooling.

Thus, more preferably at least part of the first stream may be recycled to the third reactor without compression and/or at least part of the first stream may be recycled to the third reactor without indirect cooling.

In particular, the heat applied to vaporise the liquid medium in the effluent withdrawn from the third or subsequent reactor and which is therefore present as heat in the first stream can be efficiently utilised to minimise or avoid any additional heat input requirement in the second reactor. In contrast, if the first stream is cooled significantly prior to the second reactor, as would be required for significant amounts of vapour to condense, then some of that useable heat is lost. In some circumstances it may then be necessary to apply additional heat in the second reactor or to the feed stream. It is therefore preferred that cooling of the first stream prior to entry into the second reactor is avoided or at least minimised.

"Indirect cooling" as used herein means use of a cooling medium where the medium to be cooled and the cooling medium do not physically mix. As used herein "indirect cooling" requires the deliberate use of a cooling medium and excludes more general loss of heat to the surroundings from pipework and other equipment. Pipework and equipment may be lagged to reduce such heat losses.

Usually indirect cooling is applied using a cooling medium through the walls of a pipe or vessel, such as in a heat exchanger.

More generally, and whilst it is preferred that cooling of the first stream prior to entry into the second reactor is avoided or at least minimised, nevertheless a portion of the first stream may condense prior to entry to the second reactor.

It is also possible that the first stream can contain small quantities of solids. For example, whilst the vaporisation of monomer and diluent is performed so that these are separated from the bulk of the polymer solids in the effluent from the third or subsequent reactor, prior to these components being used as the first stream, it is possible that the first stream can contain entrained solids, generally referred to as "fines". A particular advantage of the present invention is that these entrained solids do not need to be removed from the first stream prior to the second reactor, as is described further below.

Most preferably, the first stream is passed directly from its source, for example a flash tank or other means to separate vaporised medium from the polymer solids/rest of the effluent, to the second reactor. By "directly" is meant without intermediate treatment, such as direct or indirect cooling or treatment to separate certain components, such as fines.

The pressure at which the first stream is separated from the polymer withdrawn from the third or subsequent reactor is preferably equal to or higher than the pressure in the second reactor. Thus, it is preferred that the first stream is passed from its source, for example a flash tank or other means to separate vaporised monomer from the polymer solids/rest of the effluent, to the second reactor without any compression.

The first stream is preferably separated from the polymer withdrawn from the third or subsequent reactor at high pressure. The term "high pressure" as used herein refers to streams and stages which are at a pressure of 0.5 MPa (5 bar) and above, and usually 0.7 MPa (7 bar) and above. There is no specific maximum pressure, but for practical purposes the term "high pressure" is usually less 2 MPa (20 bar), and usually less than 1.5 MPa (15 bar). Thus, the first stream is more preferably separated from the polymer withdrawn from the third or subsequent reactor at a pressure between 0.7 MPa and 1.5 MPa. Most preferably the first stream is separated from the polymer withdrawn from the third or subsequent reactor at a pressure between 0.8 MPa and 1.2 MPa.

The separation is preferably a "high pressure flash" separation. In particular, the effluent of polymer solids in liquid diluent is heated and passed to a vessel such that the diluent is vaporised ("flashed") and separated as vapour from the polymer solids. It is desired that the pressure and temperature are such that the majority of the diluent, monomer and comonomer are recovered in the vapour and can be condensed without compression. (Although, as noted, it is preferred that the first stream is not condensed prior to the second reactor.) Examples of such systems can be found, for example, in WO 2005/003188 which discloses the use of a higher pressure flash stage followed by a lower pressure flush stage. However, processes are also known where the lower pressure stage is a flash stage rather than a flush stage, or where both flashing and flushing occur in a single stage. (It can be noted that a flush stage can also be referred to as a "purge stage". The term "flush" is used herein for such steps to avoid any confusion with process purges, which are steps whereby streams are removed from a polymerisation process, for example to flare. The term "purge" as used herein therefore refers to a stream which is removed from the process rather than a flush step.)

Preferably, the pressure in the second reactor is approximately the same as the pressure at which the first stream is separated from the polymer withdrawn from the third or subsequent reactor. However, a small pressure differential is usually present due to inherent pressure drops in the connecting pipework.

Preferably, the first stream comprising the monomer and is derived from the effluent withdrawn from the third reactor.

Most preferably the present invention is applied in process comprising only three reactors i.e. first, second and third reactors.

Most preferably, in this aspect the present invention provides a process for the polymerisation of monomer selected from ethylene and propylene in a reaction system consisting of first, second and third reactors operated in series, which process comprises (a) polymerising monomer in a first reactor, said first reactor having a volume of at least 50 m$^3$, to produce a slurry of a first polymer, (b) passing a slurry of the first polymer to a second reactor along with a feed stream comprising monomer and which is derived from the effluent withdrawn from the third reactor, and polymerising monomer in the second reactor to produce a slurry of a second polymer, said second polymer comprising the first polymer and polymer produced in the second reactor, (c) passing a slurry of the second polymer to a third reactor, said third reactor having a volume of at least 50 m$^3$, and polymerising monomer in the third reactor to produce a slurry of a third polymer, said third polymer comprising the second polymer and polymer produced in the third reactor, wherein the polymerisations are performed such that between 0.01 and 5 wt % of the total mass of the third polymer is polymer produced in the second reactor.

In addition to a slurry of second polymer, the second reactor generally provides a vapour stream, which can be passed to further processing.

In particular, as already noted, preferably the reaction in the second reactor takes place in a vessel or combination of vessels in which both a liquid and a vapour phase are present. The components from the first stream and the slurry of first polymer passed to the second reactor will distribute between these phases. Generally, the liquid phase will comprise the first/second polymer and a significant amount of the diluent (which may come from both the slurry of the first polymer and the first stream), as well as heavier components such as comonomers and other solids, such as "fines", whilst the vapour phase generally comprises lighter components such as hydrogen.

The properties of the polymer obtained in the second reactor can be controlled by controlling the monomer and other components of the composition in the second reactor, and in particular in the liquid phase (where the active polymer is).

As has already been noted the monomer will distribute between liquid and vapour phases in the second reactor, and the properties of the polymer obtained can be controlled by controlling the monomer present in the liquid phase.

It can be noted that many of the components which would normally be used to control polymer properties in the second reactor will be present in one or both of the first stream and the slurry of the first polymer, and hence control of these can be used to control the amounts present in the second reactor. It is also possible to feed further components separately to the second reactor as has been previously noted, in order to obtain the desired concentrations in the second reactor.

The monomer in the process of the present invention is ethylene or propylene. For avoidance of any doubt, the term "monomer" as used herein refers to the olefin which is present in the largest amount in the final polymer formed, and may also be referred to as the "principal monomer", whilst the term "comonomer" as used herein refers to olefins other than the monomer which may be present in the final polymer. More than one comonomer may be present.

The monomer is preferably ethylene. Where ethylene is the monomer, propylene may be the comonomer, but the comonomer is preferably selected from 1-butene, 1-hexene and 1-octene, with 1-hexene being most preferred.

Where propylene is the monomer, the comonomer is preferably selected from ethylene, 1-butene, 1-hexene and 1-octene.

The comonomer is preferably 1-hexene.

Preferred diluents which may be used are inert hydrocarbons, more preferably butanes, especially iso-butane, pentanes and mixtures thereof. Iso-butane is most preferred.

In more detail, the present invention provides, as a second aspect, a process for the polymerisation of monomer selected from ethylene and propylene in first, second and third reactors connected in series, said first and second reactors being slurry loop polymerisation reactors each having a volume of at least 50 m$^3$, which process comprises:

1) polymerising monomer in the first reactor in the presence of a diluent to produce a first polymer slurry comprising a first polymer suspended in a liquid medium comprising diluent and unreacted monomer,
2) withdrawing a portion of the first polymer slurry as a first effluent comprising the first polymer, diluent and unreacted monomer,
3) passing said first effluent to the second reactor and polymerising monomer in the presence of a diluent to produce a second polymer slurry comprising a second polymer, comprising the first polymer and polymer produced in the second reactor, suspended in a liquid medium comprising diluent and unreacted monomer,
4) withdrawing a portion of the second polymer slurry as a second effluent comprising the second polymer, diluent and unreacted monomer,
5) Passing said second effluent to the third reactor and polymerising monomer in the presence of a diluent to produce a third polymer slurry comprising a third polymer, comprising the second polymer and polymer produced in the third reactor, suspended in a liquid medium comprising diluent and unreacted monomer,
6) Withdrawing a portion of the third polymer slurry as a third effluent comprising solid polymer, diluent and unreacted monomer, and
    7) Passing said third effluent to a separation step for separating a first stream comprising vaporised diluent and unreacted monomer from said third polymer, characterised in that at least a portion of the first stream is passed to the second reactor wherein it is contacted with the first effluent to produce said second polymer slurry and a second stream comprising vaporised diluent and unreacted monomer, and wherein between 0.01 and 5 wt % of the total mass of the third polymer is polymer produced in the second reactor.

More generally, the present invention has advantageously been found to result in transfer of components from the first stream into the polymer slurry in the second reactor, and from there to the second effluent and to the third reactor. At the same time, components in the first effluent can be transferred into the second stream.

An example is entrained solids in the first stream. Entrained solids in the first stream are preferentially entrained into the effluent to the third reactor, and thereby are recycled to the third reactor. Such solids can be catalytically active and their recycle to the third reactor not only prevents the loss of such active components, but also prevents them being able to react and potentially cause fouling in downstream processing of the vapour. Filters and/or cyclones, which are often used to remove entrained fines from the vapour, for example of flash tank overhead lines, can be avoided.

The ability to avoid filters operating on the first stream is particularly advantageous. In particular, such filters can be prone to plugging due to condensation of components in the first stream at high pressure. Back-flushing of filters to remove blockages on high pressure filters can be generally harder and has greater propensity to cause filter damage. Thus, filters on high pressure streams can be particularly prone to operational problems.

Preferably, therefore, the present invention comprises no filters or solids removal equipment which act on the first stream, and in particular it is preferred that the first stream is passed from its source, for example a flash tank or other means to separate vaporised medium from the polymer solids/rest of the effluent, to the second reactor without passing through any filters. Further, the ability of the second reactor to remove entrained fines from the first stream prior to subsequent treatment means that filters can be avoided in other parts of the high pressure recovery system. More generally therefore the polymerisation process preferably comprises no filters operating at pressures above 0.5 MPa, more preferably no filters operating above 0.4 MPa, and most preferably no filters operating above 0.2 MPa.

The present invention can also remove components from the effluent stream from the first reactor passed to the second reactor which are not required in the third reactor or are required in lesser amounts in the third reactor than in the first, and to enhance in the effluent stream passed to the third reactor components which are required in the third reactor or are required in greater amounts in the third reactor than in the first.

In addition to solids, where present in the first stream, as noted above, the invention may be illustrated with respect to hydrogen and comonomer components. In some processes operating in loop reactors in series, hydrogen may be desired in the first reactor but not in the third, or at least the amount of hydrogen desired in the third reactor is lower than in the first reactor. Similarly, comonomer may be desired in the third reactor but not in the first reactor, or at least the amount of comonomer required is higher in the third reactor than in the first reactor. Thus, the first polymer slurry and the first effluent also comprise hydrogen, and the third polymer slurry and the third effluent also comprise unreacted comonomer. In "conventional treatment", the first effluent may be passed to an intermediate treatment step in which at least a portion of the hydrogen is separated from the first effluent prior to its passage to the third reactor.

Whilst this can reduce the hydrogen significantly it can be difficult to remove sufficient hydrogen in this way without a significant reduction in pressure and/or without significant diluent or monomer loss with the hydrogen (which may be passed to flare).

In the process of the present invention it has been found that contacting of the first stream/separated vapour from the slurry exiting the third reactor, which has relatively reduced hydrogen and relatively increased comonomer compared to the first slurry/first effluent, results in an increase in the hydrogen in the second stream compared to the first stream and an increase in comonomer in the second effluent compared to the feed first effluent.

The "increase" usually, and preferably, manifests itself as an increase in the absolute quantities of said components in said streams, measured in mass flow rates of the particular components.

The "increase" usually in addition manifests itself as increase in the ratios of the particular components to monomer in said streams, for example hydrogen to ethylene ratio and comonomer to ethylene ratio may be increased. In an alternative embodiment the increase may manifest itself only as an increase in the ratios of particular components to monomer i.e. without a requirement for an increase in the absolute mass flow rates. Thus, an increase in hydrogen is a particular stream means that the ratio of hydrogen to ethylene increases, whilst an increase in comonomer in a particular stream means that the ratio of comonomer to ethylene increases.

It will be apparent that in order to maintain a mass balance in the polymerisation system of the second aspect of the invention the majority of the diluent and unreacted monomers recovered from the third effluent actually have to be recycled to the first reactor rather than the second. Thus, the second stream, in an opposite result to the second effluent passing to the third reactor, is enhanced in the components desired in the first reactor and poorer in the components not desired, or desired in lesser quantities. Thus, in the example of hydrogen and comonomer given previously, the second stream is enhanced in hydrogen and poorer in comonomer than the first stream. This also therefore reduces the subsequent treatment of the vapour which is required prior to recycling to the first reactor.

More particularly, greater than 80%, such as greater than 90%, for example essentially all (by which is meant greater than 99%) of the comonomer in first stream prior to the second reactor may be returned to third reactor via the second polymer slurry/second effluent.

In contrast, greater than 80%, such as greater than 90%, for example essentially all (by which is meant greater than 99%) of the hydrogen in the first polymer slurry/first effluent is passed to further processing.

The second reactor preferably comprises a stirred tank which is configured in association with a fractionator to yet further enhance the separation achieved. In particular, the vapour stream (second stream) recovered from the stirred tank may be passed to a fractionator, from which heavier components, including comonomer, are recovered from the base and passed back to the stirred tank, whilst lighter components, such as hydrogen and monomer, and also diluent, are recovered from the fractionator as a vapour for further treatment and recycle.

More generally, the combined stirred tank/fractionator may be considered as a fractionation system which not only as a second reactor in which polymerisation occurs, but which also efficiently acts to fractionate the mixture of feed polymer slurry/first effluent and first stream passed thereto.

The vapour, or at least a portion thereof, recovered from the second reactor is typically passed to one or more steps which may include removal of inert components, especially inert light components such as nitrogen and ethane which can otherwise build-up in the system, and/or which may include removal of "heavy" components, such as comonomer and components heavier than comonomer, prior to recycle.

After the high pressure separation step for separating a vapour comprising diluent and unreacted monomer from polymer solids from the third (or subsequent) reactor the polymer solids are usually passed from the high pressure recovery system to a low pressure recovery system. The low pressure recovery system may comprise a low pressure separation step for separating further diluent, unreacted monomer and unreacted comonomer from said solids, and a recycle system for recycling at least a portion of the further diluent, unreacted monomer and unreacted comonomer.

In yet further aspects the present invention provides a multimodal polymer obtainable by the above process.

Polyethylene is used on a variety of applications such as film, pipe, blow moulding, stretched tapes and fibres, injection moulding, caps and closures, extrusion coating, etc. For each of these applications a particular set of properties is required. These properties generally relate to the processability of the polymer, i.e. the performance of the polymer during extrusion or moulding of the desired article, the mechanical properties, i.e. the properties of the finished article when exposed to force or stress, optical and organoleptic properties.

Processability is typically evaluated through measurement of melt flow ratios, die swell, melt strength, spiral flow, melt rheology, etc. Typical methods for the evaluation of mechanical properties are the measurements of tensile properties, creep resistance, environmental stress crack resistance (ESCR), rapid crack propagation (RCP), impact resistance, tear resistance, etc.

These properties are related to the macroscopic properties of the polyethylene, particularly molecular weight and density, and have in many cases an inverse relationship, e.g. spiral flow of a polyethylene will increase whereas the ESCR will decrease as the molecular weight of the polymer is decreased. Therefore, polyethylene compositions having a unimodal or monomodal molecular weight distribution, i.e. comprising a single ethylene polymer fraction have disadvantages in achieving a good balance between processability and mechanical properties.

In comparison, polyethylene compositions having a bimodal molecular weight distribution, i.e. comprising a two ethylene polymer fractions have been developed to overcome the limitations of the monomodal compositions. As a result of the combination of two ethylene fractions having different molecular weights and densities, bimodal polyethylene compositions generally exhibit a better balance between processability and mechanical properties. WO 0170872 A1, WO 07028552 A1, WO 06018245 A1 and WO 06053709 A1 describe such bimodal compositions for caps, pipe, film and fibre applications, respectively.

It was an object of the present invention to provide a polyethylene composition which is based on polyethylene and has even better mechanical properties, while retaining a good processability with respect to its use, by introducing a third fraction into the polyethylene composition.

Whilst trimodal compositions have been previously disclosed, such as in WO 2004056921 A1, WO 2004058877 A1, WO 2006092377 A1, WO 2006092378 A1, WO 2007022908 A2, WO 2009077142 A1 and WO 2011092236, the fraction having the highest molecular weight in these compositions is generally present in an amount of greater than 10 wt %. This may lead polyethylene compositions having poor processability and optical properties due to the formation of gels.

The process of the first and second aspects of the present invention enables production of polyethylene compositions which are capable of making articles with an improved balance of mechanical properties and processability having a multimodal molecular weight distribution.

In particular, in a third aspect, the present invention provides a multimodal polyethylene comprising
  a) 30-70 wt % of a component A having a density of at least 940 kg/m3,
  b) 30-70 wt % of a component B having a density of at least 910 kg/m3 but less than that of component A, and
  c) 0.01 to 5 wt % by total weight of the multimodal polyethylene of a component C having a density lower than that of component B and between 900 and 940 kg/m3.

Preferably the multimodal polyethylene comprises between 0.1 and 5 wt % of component C. The multimodal polyethylene preferably comprises less than 5 wt %, for example up to 4.5 wt % of, such as up to 4 wt % of component C. More preferably the multimodal polyethylene comprises between 0.25 and 2.5 wt % of component C, and most preferably between 0.5 and 1.5 wt % of component C.

Component A has a density of at least 940 kg/m3. Component A may be a homopolymer of ethylene or may be a copolymer of ethylene and a comonomer, in which case the preferred comonomers are as described in the first aspect of the present invention. Component A may have a melt index (MI2) of at least 100 g/10 min. Preferably the MI2 of component A is less than 1000 g/10 min, and most preferably between 200 and 600 g/10 min. Alternatively, or additionally, component A may have a weight average molecular weight less than 50,000 g/mol, preferably more than 5,000 g/mol, and most preferably between 10,000 and 40,000 g/mol.

Component B has a density of at least 910 kg/m3 but less than that of component A. Component B is a copolymer of ethylene and a comonomer, preferred comonomers again being as described in the first aspect of the present invention. Component B may have a lower melt index (MI2) than that of component A. Alternatively, or additionally, component B may have a weight average molecular weight of higher than that of component A.

Component C has a density lower than that of component B and between 900 and 940 kg/m3. Component C is a copolymer of ethylene and a comonomer, preferred comonomers again being as described in the first aspect of the present invention. Preferably the density is less than 930 kg/m3, for example less than 920 kg/m3. Component C may have a melt index (MI2) less than or equal to that of component A. Alternatively, or additionally, component C may have a weight average molecular weight of higher than or equal to that of component B.

As used herein:
1) density should be measured according to ISO 1183-1 (Method A) on a sample plaque prepared according to ASTM D4703 (Condition C) where it is cooled under pressure at a cooling rate of 15° C./min from 190° C. to 40° C.,
2) melt index: MI2 should be measured in accordance with the procedures of ISO 1133 at 190° C. using a load of 2.16 kg,
3) weight average molecular weight (Mw) should be measured by steric exclusion chromatography (SEC) according to the ISO 16014-1 and ISO 16014-2.

EXAMPLE

Ethylene is polymerised in three reactors in series. The first and third reactors are slurry loop reactors each having a volume of 120 m$^3$. The second reactor is a stirred tank and an associated fractionator on the overhead. The total production rate is approximately 37.5 tonnes per hour.

In the first reactor ethylene is polymerised in the substantial absence of comonomer, but in the presence of hydrogen and with isobutane as diluent. The density produced in the first reactor is approximately 970 kg/m$^3$.

Polymer slurry is withdrawn from the first reactor. It comprises polymer solids, isobutane, ethylene, ethane and hydrogen. In particular, the liquid phase comprises approximately 90.8 mol % isobutane, 3.0 mol % ethylene, 3.9 mol % ethane and 1.3 mol % hydrogen. This stream is passed to the second reactor. Also passed to the second reactor is a vapour stream recovered from the effluent from the third reactor as described further below, and which comprises isobutane, ethylene and 1-hexene (comonomer), but is substantially free of hydrogen. In particular, the vapour stream comprises approximately 90 mol % isobutane, 3.5 mol % 1-hexene and 3 mol % ethylene. The total amount of monomer (ethylene) available to react in the second reactor is approximately 1200 kg/hr (which corresponds to about 3 wt % of the total production rate).

The stirred tank is at a pressure of 0.95 MPa and at a temperature of 65° C. The residence time is 30 minutes.

Under these conditions a polyethylene is produced in the liquid phase in the stirred tank. The polyethylene has a density of approximately 920 kg/m$^3$.

Polymer slurry is recovered from the stirred tank and passed to the third reactor. The slurry recovered comprises a second polymer, which itself comprises all of the first polymer recovered from the first reactor, as well as the additional polymer produced in the second reactor. The slurry is also substantially free of hydrogen, but comprises essentially all of the 1-hexene fed to the second reactor in the vapour stream.

In the third reactor further ethylene is polymerised in the presence of 1-hexene as comonomer and in the substantial absence of hydrogen, again in the presence of isobutane.

Polymer slurry is withdrawn from the third reactor and passed via a slurry heater, in which the liquid components of the slurry are vaporised, to a separation vessel at a pressure of 0.95 MPa. The separated vaporised liquid components are then passed as the vapour stream to the second reactor.

Polymer solids are withdrawn from the separation vessel for further processing. The final polymer (third polymer) product from the third reactor is analysed. It has a density of 948 kg/m$^3$ and comprises 1 wt % of the polymer produced in the second reactor.

The invention claimed is:

1. A process for the polymerisation of monomer selected from ethylene and propylene in a reaction system comprising at least three reactors operated in series, which process comprises
   (a) polymerising monomer in a first reactor, said first reactor having a volume of at least 50 m$^3$, to produce a first polymer,
   (b) passing the first polymer to a second reactor and polymerising monomer in the second reactor to produce a second polymer comprising the first polymer and polymer produced in the second reactor,
   (c) passing the second polymer to a third reactor and polymerising monomer in the third reactor to produce a third polymer comprising the second polymer and polymer produced in the third reactor,
   wherein the polymerisations are performed such that between 0.01 and 5 wt % of the total mass of the third polymer is polymer produced in the second reactor.

2. A process according to claim 1 wherein the third reactor has a volume of at least 50 m$^3$.

3. A process according to claim 1 wherein both the first and third reactors are slurry loop reactors.

4. A process according to claim 3 wherein the second reactor also comprises a slurry phase.

5. A process according to claim 1 wherein the second reactor comprises a stirred tank, and wherein both a liquid and a vapour phase are present.

6. A process according to claim 1 wherein the production rate (amount of polymer produced per unit time) in the second reactor is reduced compared to the first and third reactors and/or wherein the space time yield (STY) in the second reactor, which is a measure of the amount of polymer produced per unit time per unit volume of the reactor, is reduced in the second reactor compared to the first and third reactors.

7. A process according to claim 1 wherein the pressure in the second reactor is above 0.5 MPa (5 bar), and is 10-90% lower than the lowest of the first reactor pressure and the third reactor pressure.

8. A process according to claim 1 wherein the temperature in the second reactor is in the range 40 to 100° C.

9. A process according to claim 1 wherein the second reactor comprises liquid and vapour phases and the distribution of diluent present between the liquid and vapour phases in the second reactor is such that at least 30% of the diluent is in the liquid phase.

10. A process according to claim 1 wherein the residence time in the second reactor is in the range of 10 to 90 minutes.

11. A process according to claim 1 wherein between 0.1 and 5 wt % of polymer, based on total mass of the third polymer is polymer produced in the second reactor.

12. A process according to claim 1 which process comprises
(a) polymerising monomer in a first reactor to produce a slurry of a first polymer,
(b) passing a slurry of the first polymer to a second reactor and polymerising monomer in the second reactor to produce a slurry of a second polymer, said second polymer comprising the first polymer and polymer produced in the second reactor,
(c) passing a slurry of the second polymer to a third reactor and polymerising monomer in the third reactor to produce a slurry of a third polymer, said third polymer comprising the second polymer and polymer produced in the third reactor.

13. A process according to claim 1 wherein a separate feed comprising monomer is added to the second reactor.

14. A process according to claim 1 wherein the second reactor comprises a liquid phase and the liquid phase in the second reactor comprises 0.1 to 1 mol % monomer.

15. A process according to claim 1 wherein the second reactor comprises a liquid phase and the molar ratio of comonomer to monomer in the liquid phase in the second reactor is between 24:1 and 4:1 by moles of comonomer to monomer.

16. A process according to claim 1 wherein there is fed to the second reactor the first polymer and a first stream comprising monomer which is derived from the effluent withdrawn from the third or a subsequent reactor.

17. A process according to claim 1 which process comprises
(a) polymerising monomer in the first reactor to produce a slurry of a first polymer,
(b) passing a slurry of the first polymer to a second reactor and polymerising monomer in the second reactor to produce a slurry of a second polymer, said second polymer comprising the first polymer and polymer produced in the second reactor,
(c) passing a slurry of the second polymer to a third reactor, said third reactor having a volume of at least 50 m³, and polymerising monomer in the third reactor to produce a slurry of a third polymer, said third polymer comprising the second polymer and polymer produced in the third reactor,
wherein there is also fed to the second reactor a first stream comprising monomer which is derived from the effluent withdrawn from the third or a subsequent reactor.

18. A process according to claim 16 wherein the third or subsequent reactor is a slurry reactor and produces an effluent in the form of a slurry of polymer solids in a liquid medium comprising diluent, and this stream is treated to vaporise the components of the liquid medium, which are then separated from the polymer solids, wherein the first stream is at least 80% by weight of this separated stream.

19. A process according to claim 16 wherein at least 80% by weight of the first stream is in vapour form when passed to the second reactor and/or wherein at least part of the first stream is passed to the second reactor without compression and/or at least part of the first stream is passed to the second reactor without indirect cooling.

20. A process according to claim 16 wherein the first stream is separated from the polymer withdrawn from the third or subsequent reactor at a pressure of 0.5 MPa (5 bar) and above.

21. A process according to claim 16 wherein the process comprises only three reactors i.e. the first, second and third reactors.

22. A process according to claim 16 wherein the second reactor comprises a stirred tank which is configured in association with a fractionator, and wherein lighter components, such as hydrogen and monomer, and also diluent, are recovered from the fractionator as a vapour for further treatment and recycle.

23. A process according to claim 10 wherein the residence time in the second reactor is in the range of 15 to 60 minutes.

24. A process according to claim 11 wherein between 0.5 and 1.5 wt % of polymer based on total mass of the third polymer is polymer produced in the second reactor.

25. A process according to claim 15 wherein the second reactor comprises a liquid phase and the molar ratio of comonomer to monomer in the liquid phase is higher in the second reactor than in either of the first and third reactors.

26. A process according to claim 18 wherein the first stream is essentially all of the separated stream.

27. A process according to claim 26 wherein essentially all of the first stream is in vapour form when passed to the second reactor.

* * * * *